United States Patent [19]
Hehmann et al.

[11] 3,850,261
[45] Nov. 26, 1974

[54] WIDE BAND WIDTH SINGLE LAYER SOUND SUPPRESSING PANEL

[75] Inventors: Horst W. W. Hehmann, Cincinnati; Edwin B. Smith, Mason, both of Ohio

[73] Assignee: General Electric Company, Cincinnati, Ohio

[22] Filed: Mar. 1, 1973

[21] Appl. No.: 337,137

[52] U.S. Cl. .......................... 181/33 G, 181/33 H;50
[51] Int. Cl. ............................................. E04b 1/82
[58] Field of Search ........... 181/33 G, 33 GA, 33 H, 181/33 HA, 33 HB, 48, 50, 59, 68–70

[56] References Cited
UNITED STATES PATENTS

| | | | |
|---|---|---|---|
| 3,437,173 | 4/1969 | Ehrich | 181/48 |
| 3,481,427 | 12/1969 | Dobbs et al. | 181/33 G |
| 3,507,355 | 4/1970 | Lawson | 181/48 |
| 3,542,152 | 11/1970 | Adamson | 181/50 |

FOREIGN PATENTS OR APPLICATIONS

| | | | |
|---|---|---|---|
| 822,954 | 11/1959 | England | 181/33 G |
| 348,808 | 9/1960 | Switzerland | 181/33 G |

*Primary Examiner*—Richard B. Wilkinson
*Assistant Examiner*—Vit W. Miska
*Attorney, Agent, or Firm*—Derek P. Lawrence; Lee H. Sachs

[57] ABSTRACT

A sound suppressing panel for use in a duct is provided with a single layer of resonance cavities. The cavities are defined between a first wall partially defining the duct, a second wall spaced radially from the duct, a first plurality of partitions extending from the first wall to the second wall and circumferentially disposed relative to the duct, and a second plurality of partitions similarly arranged but disposed axially with respect to the duct. In order to achieve broad frequency suppression band width, preselected of the circumferentially extending partitions are canted (diagonally disposed) relative to the first and second walls so that acute and obtuse angles, rather than right angles, are defined. Adjacent pairs of the partitions are canted so as to be substantially parallel with one another. Throughout the panel, partitions can be canted uniformly or nonuniformly and disposed with angles of cant depending on overall frequency suppression desired.

1 Claim, 4 Drawing Figures

PATENTED NOV 26 1974 3,850,261
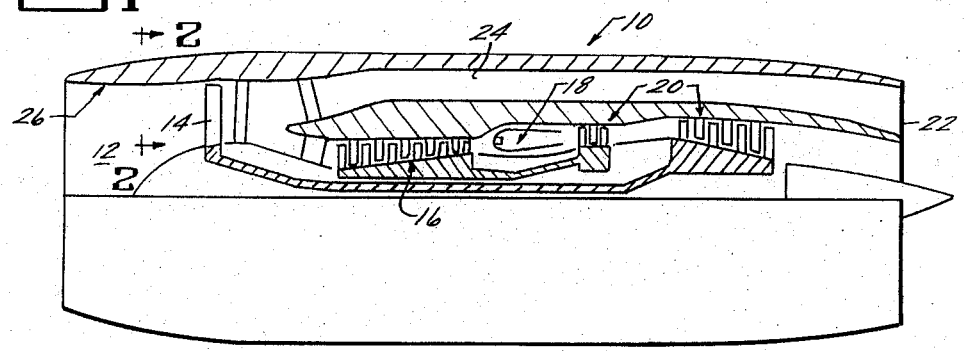
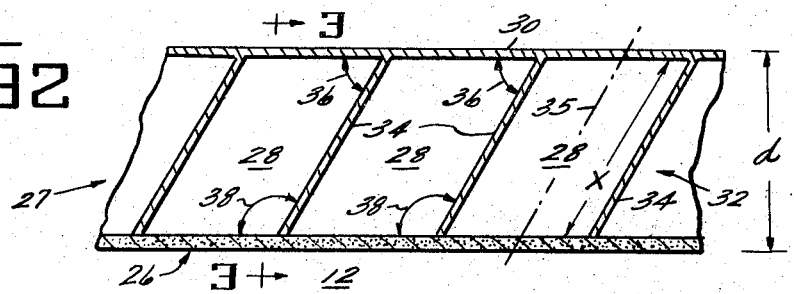
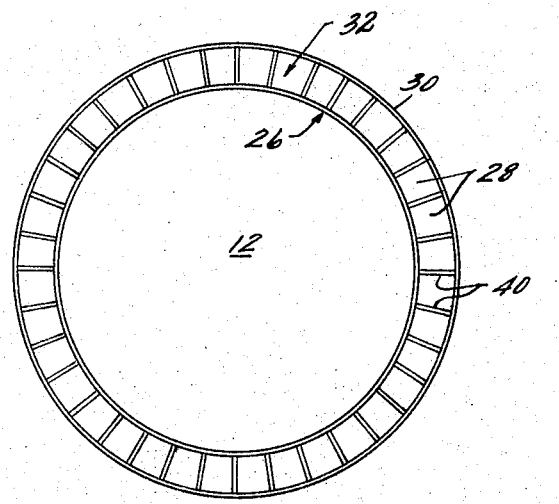
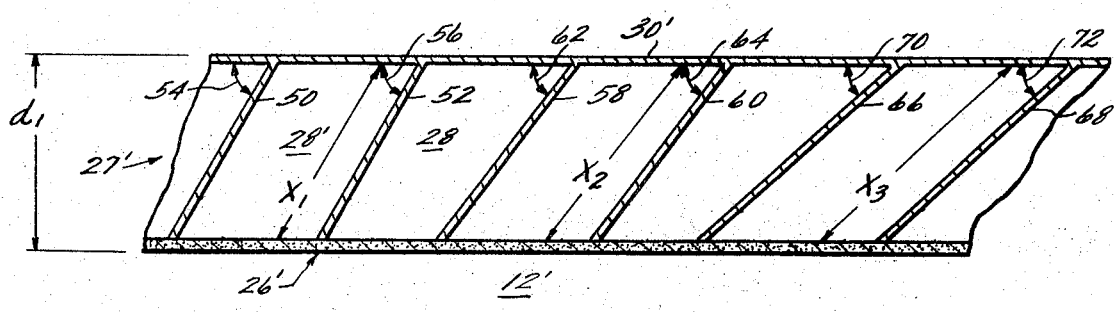

WIDE BAND WIDTH SINGLE LAYER SOUND SUPPRESSING PANEL

BACKGROUND OF THE INVENTION

This invention relates to sound suppression and, more particularly, to acoustic treatment of duct walls in gas turbine engines.

Various means have been used in the past to suppress noise generated within gas turbine engines. Generally, noise treatment has been directed primarily toward high frequency noise. More recently, however, increased concern over noise has led to interest in suppressing noise of broad frequency ranges, including both high and low frequencies.

Prior attempted solutions have included bulk absorbers which comprise, in one form, a solid blanket of porous material disposed upon duct walls. Bulk absorbers are not desirable for aircraft engine application because of problems of fluid retention and mechanical stability. In addition, such absorbers operate to suppress sound frequency as a function of absorber thickness so that low frequency absorption requires high thickness, which is disadvantageous from the viewpoint of desirable thin nacelle construction.

Another broad range treatment includes multiple degree of freedom tuned cavity systems. Such systems are essentially Helmholtz resonators disposed in various arrays. The tuned Helmholtz resonator suppresses sound about a narrow band centered at a particular predetermined (tuned) resonant frequency which is a function of a number of variables including cavity size. Hence, conventional Helmholtz resonators require a variety of cavity sizes to suppress wide frequency ranges of sound. Furthermore, varying cavity size reduces the noise reduction achievable in a given frequency band. These arrays are unfortunately thick and mechanically complex and therefore costly. In addition, such arrays have in the past been quite heavy, and excess weight is particularly abhorrent with respect to aircraft engines.

In order to overcome such objections as presented by the prior art wide band suppression devices, the present invention utilizes basic Helmholtz resonator technology but imposes thereon a basic variation by which an individual cavity is put to plural uses to suppress sound of frequency ranges centered about two (rather than one) independently tuned resonant frequencies. This has been accomplished by recognizing that an individual resonance cavity can function both as a Helmholtz resonator and also as an independently tuned quarter-wave tube resonator. Proper parametric definition permits an individual cavity to suppress sound in both regimes since the characteristic or resonant frequency of an individual cavity under the Helmholtz regime is dependent upon different variables than is the resonant frequency of the quarter-wave tube resonator. This can be seen by a comparison between the following equations, wherein equation 1 defines the relationship between Helmholtz frequency and cavity parameters while equation 2 defines the relationship between quarter-wave tube resonator frequency and cavity parameters.

$$f_H = C/2\pi \sqrt{OA/l_{eff}d}, \quad l_{eff} \approx t + k(2r) \quad (1)$$

where $l_{eff}$ = effective neck length;
$OA$ = open area ratio;
$t$ = face plate thickness;
$2r$ = hole diameter;
$C$ = velocity of sound;
$d$ = cavity depth;
$k$ = a constant.

$$f_{\lambda/4} = nC/4x, \quad n = 1, 3, 5, \ldots \quad (2)$$

where
$C$ = velocity of sound;
$x$ = cavity length.

It can be seen that cavity depth ($d$), which is measured along a line mutually perpendicular to the cavity-defining face sheet and backing wall, is not necessarily equal to the cavity length parameter ($x$), which is measured along an axis of the cavity parallel to the side walls thereof. The present invention is a recognition of the fact that cavity depth ($d$) may be maintained by fixing the spacing between the face sheet and backing wall, while cavity length ($x$) can be varied by varying the angular disposition of the cavity side walls. In other words, predetermining the spacing between the face sheet and backing wall will determine a fixed cavity depth ($d$) in the Helmholtz regime; however, the cavity length ($x$) in the quarter-wave regime can be lengthened for the same cavity by means of disposing the side walls thereof at an angle other than a right angle to the face sheet and backing wall, so that cavity length is measured along a similar angle.

The present invention is also a recognition of the fact that any Helmholtz resonator cavity will act both in the Helmholtz regime and in a tube resonator regime, but that proper dimensional definition is required to maintain the Helmholtz resonance frequency below that of the tube resonator frequency. If this latter relationship is not maintained, the sound suppression in the Helmholtz resonator regime is effectively lost.

Thus, the present invention permits the cavity depth and other Helmholtz regime parameters to be predetermined in order to suppress sound of a frequency band centered about a first resonant frequency in the Helmholtz regime. In addition, the cavity side walls can be canted in order to vary the cavity length and, consequently, establish a second and independently tuned resonant frequency, in the quarter-wave tube resonator regime, about which a second frequency band is suppressed. This latter manipulation in the quarter-wave tube resonator regime may be accomplished without affecting the resonant frequency in the Helmholtz regime. As a result, the present invention facilitates the utilization of a single layer of cavities (a single degree of freedom absorber) to provide the tuned wide band width absorption characteristic of a two-degree of freedom absorber.

BRIEF SUMMARY OF THE INVENTION

It is therefore a primary object of the present invention to provide a single degree of freedom sound suppressor, with its attendant simplicity of design and thin-panel, lightweight characteristics, which performs as a two-degree of freedom sound suppressor to absorb broad band widths of sound frequencies.

In order to accomplish this as well as further objects which will become apparent from the detailed description which follows, the present invention provides a duct wall sound suppressing panel treatment utilizing a single layer of resonator cavities defined by a porous or otherwise sound wave permeable face sheet or first wall, a sound impermeable backing plate or second wall spaced radially from the first wall, and a plurality of circumferentially extending partitions (side walls) disposed between these first and second walls. The gap between the first and second walls is of a particular radial height to determine the cavity depth and hence the sound frequency absorption in the Helmholtz regime. The circumferential partitions are disposed in a canted relationship between the first and second walls so that the partitions define acute angles in combination with the walls. The canting of the side walls (partitions) of individual cavities defines a cavity length which is greater than the aforementioned cavity depth. This length determines resonant frequency in the quarter-wave regime. Hence, each cavity suppresses sound of two major tuned frequency bands (rather than the single tuned frequency band suppression of the prior art).

Adjacent partitions may be substantially parallel, forming uniform corresponding angles with the respective walls. In the alternative, pairs of parallel barriers may be nonuniform as to angular orientation among a plurality of such pairs. In this way, a still broader sound suppression band width may be achieved wherein individual cavities suppress sound about two basic frequencies, but other cavities suppress different frequency bands.

BRIEF DESCRIPTION OF THE DRAWING

The present invention may be more clearly understood by reference to the appended specification as well as the drawing wherein:

FIG. 1 is a cross-sectional view of a simplified gas turbine engine;

FIG. 2 is an enlarged cross-sectional view of a portion of a treated duct wall of FIG. 1 according to the present invention, taken along line 2—2 of FIG. 1;

FIG. 3 is an axial cross-sectional view of a portion of a panel taken along line 3—3 of FIG. 2; and FIG. 4 depicts a cross-sectional view of an alternative embodiment of a sound suppressing panel similar to that depicted in FIG. 2.

DETAILED DESCRIPTION

In FIG. 1, the simplified gas turbine engine designated generally 10 includes an annular duct 12, a bladed fan 14, a compressor 16, combustion chamber 18, and turbine 20 along with an exhaust nozzle 22. This engine operates in a fashion similar to typical engines of this variety. Atmospheric air enters inlet 12 to the left in FIG. 1 to be compressed by fan 14 and compressor 16, a portion of the flow passing through a fan duct 24 and the remainder through the compressor 16 and into combustor 18. Within the combustor, the air is mixed with fuel and ignited, whereupon rapid expansion of the fuel occurs and a high-velocity stream of products of combustion exits the combustor to the right and engages the rotatable bladed stages of turbine 20 to impart torque thereto for the operation of fan 14 and compressor 16. The gas stream exiting the turbine 20 is combined with the fan stream within duct 24 and expelled through the exhaust nozzle 22 to provide a substantial thrust toward the left in the Figure.

Objectionable noise has been determined to be generated in several portions of the engine: the fan blades rotating at high tip velocities generate a broad spectrum of noise frequencies; compressors and turbines generally generate high frequence noise; and the combustors are also a source of noise. As a means for reducing the noise propagated within the engine, the present invention provides a sound suppressing treatment for the wall 26 defining duct 12 (or for similar duct surfaces throughout the engine such as the wall defining the fan duct 24 and the surfaces of the nozzle 22).

More specifically, referring to FIG. 2, a first embodiment of the present invention is depicted in application to wall 26, as an example of typical wall applications. This figure shows an enlarged view of the duct wall 26 whereupon a panel 27 incorporating a plurality of resonator cavities is disposed. It can be seen from this drawing that the individual cavities 28 are partially defined by a face sheet or first wall 26, which also substantially circumscribes the duct as stated above. This wall is porous or otherwise permeable by sound waves.

A backing plate or second wall 30, which is sound wave impermeable, is spaced radially from the first wall which it circumscribes and with which it combines to define an annular gap 32 which extends axially of the duct between the two plates. (The radial distance separating these plates is the cavity depth ($d$) introduced hereinabove). Disposed within gap 32 and extending substantially from wall 30 to wall 26 are a plurality of partitions for subdividing gap 32 to further define cavities 28.

According to a primary object of the present invention, partitions 34 are canted with respect to plate 30 so that adjacent pairs of partitions form substantially acute corresponding angles with respect to wall 30. In FIG. 2, the corresponding acute angles are designated 36. Partitions 34 extend into proximity with wall 26 and form therewith obtuse angles designated 38. These angles are the included angles opposed to the foregoing acute angles 36. The partitions are spaced axially of one another relative to the duct and define a volume of predetermined size for each cavity.

As depicted in FIG. 3, gap 32 is further subdivided by means of a second plurality of partitions 40 disposed between walls 26 and 30 which extend axially with respect to the duct and are circumferentially spaced from one another to delimit the volume of individual resonance cavities 28. These partitions extend radially between and engage each of the circular walls 26, 30 substantially at right angles to a tangent at the point of intersection. Partitions 34 and 40 are all substantially impermeable to sound wave energy, and the combination of four segments of these intersecting partitions defines four impermeable sides of a given cavity 28. Each cavity structure is completed by a portion of the impermeable wall 30 and the permeable wall 26.

In sound suppressing operation, each cavity 28 operates in the Helmholtz regime to suppress sound energy (according to the foregoing Helmholtz equation) as a function of the preselected magnitudes of the parameters open area ratio (OA), face plate thickness ($t$), hole diameter ($2r$) and cavity depth ($d$). In a given application, one band of offending sound wave frequencies may be counteracted by application of a plurality of cavities 28 whose parameters are selected to suppress sound in the Helmholtz regime of this preselected frequency band.

According to a primary object of the present invention, the canted disposition of circumferentially extending partitions 34 makes possible the independent tuning of cavities 28 to the suppression of a second and substantially different band of sound wave frequencies in addition to that suppressed by the cavities operating within the Helmholtz regime. More particularly, the diagonal or canted disposition of these partitions enables an individual cavity 28 to be sized to also suppress a second and higher frequency band in the quarter-wave tube resonator regime. This is true because, as mentioned hereinabove, the characteristic equations for each of these suppression regimes involve different parameters.

Referring particularly to FIG. 2, the radial distance between face sheet 26 and backing wall 30 determines the depth of cavity ($d$) for the Helmholtz regime. This distance is represented by the letter d in the Figure. On the other hand, the length of cavity ($x$) is determined by reference to the orientation of the partitions 34 forming the side walls of the individual cavities 28. In the figure, the dimension designated $x$ is measured along a line parallel to the cant angle of the side walls 34 and represented by dotted line 35. It can thus be seen that the length ($x$) is larger than the distance ($d$) and that this difference is a result of the orientation of the side walls 34. Were the side walls or partitions perpendicular to walls 26 and 30, then the cavity depth ($d$) would be equal in length to the tube length ($x$). Thus, the present invention permits variation in tube length ($x$) while cavity depth ($d$) and other Helmholtz cavity parameters are kept constant. As a result, a particular predetermined Helmholtz resonant frequency band may be suppressed by an individual cavity and a second predetermined frequency band of a substantially different (and higher) range may be suppressed in the quarter-wave tube resonance regime. Owing to the present invention, each cavity can be tuned to suppress both of these resonant frequencies, one in the Helmholtz regime and the second in the tube resonator regime.

In operation then, a gas turbine engine generates sound of many diverse frequencies. An individual cavity 28, according to the present invention, will have the capability of suppressing bands of sound centered about two separate and independent resonant frequencies. A first of these frequencies will be characteristic of Helmholtz resonator type suppression, while the second frequency is characteristic of quarter-wave tube resonator suppression. Variation of the cavity parameters mentioned above enables these two frequencies to be tuned to effect suppression of a wide range of sound frequencies. This is similar to the operation of a two-degree of freedom system, but uses the simple and lightweight characteristics of a single layer, single degree of freedom cavity array.

In the embodiment of FIG. 2, the individual partitions of preselected pairs of adjacent partitions are substantially parallel with one another so that corresponding angles 36 between the individuals of a given pair are substantially equal. In addition, in this embodiment, the plurality of partitions are substantially parallel throughout so that all of the corresponding angles 36 are substantially uniform. A panel according to this embodiment would best suppress a large quantity of sound having two dominant frequency ranges.

In situations where the sound to be suppressed comprises many frequency ranges, a second embodiment of the present invention is particularly suitable. FIG. 4 discloses such an embodiment wherein all of the elements are similar to the foregoing embodiment with the exception of the angular disposition of the circumferentially extending partitions. In this embodiment, adjacent pairs of these partitions form acute angles relative to backing wall 30'. For example, partitions 50 and 52 form acute angles 54 and 56, respectively. Similarly, partitions 58 and 60 form acute angles 62 and 64, respectively; and again, partitions 66 and 68 form acute angles 70 and 72, respectively. However, in this embodiment, the partitions are nonuniformly canted relative to the two walls 26' and 30', so that the angles formed therebetween are nonuniform in magnitude. For example, while pairs of adjacent partitions such as 50 and 52 are canted by angles 54 and 56 which are equal to one another, these angles are different from angles 62 and 64 by which partitions 58 and 60 are canted relative to wall 30'. Similarly, the equal angles 70 and 72, which determine the cant of partitions 66 and 68, are not equal to either pair of angles 54 and 56 or 62 and 64.

Upon an individual basis, the cavities 28' of this second embodiment function exactly in the same fashion as do those illustrated in FIG. 2 and described above. That is, each cavity suppresses sound in bands about resonant frequencies characteristic of the Helmholtz and quarter-wave tube resonator regimes, respectively. However, the different angular orientations between pairs of partitions determines differing quarter-wave tube resonant frequencies for suppression between cavities. In other words, each cavity still suppresses sound of bands about two frequencies, but, those frequencies are not equal to the two frequencies suppressed by other cavities. More particularly, the Helmholtz regime suppression characteristic frequency will remain constant between cavities since the cavity depth ($d_1$) is constant for the plurality of cavities. However, the quarter-wave tube resonant frequency varies among the cavities since the various cant angles define different cavity lengths ($x_1$, $x_2$, $x_3$) as shown. Hence, an even broader spectrum of sound frequencies can be suppressed using a single layer of cavities as illustrated in FIG. 4.

Thus, the present invention discloses concepts and structure for suppression of wide ranges of undesirable aircraft engine sound by treatment of duct walls within the engine. The treatment takes the form of inexpensive single degree of freedom, single layer dispositions of resonance cavities. However, the characteristics infused by the present invention permit this simple configuration to operate as a multiple degree of freedom suppression treatment to treat sound of two separate resonant frequencies by means of individual resonance cavities.

While this invention has been disclosed with respect to two particular embodiments, the concepts thereof are not limited to either the structural representations thereof or the environment within which presented. For example, broad band sound frequency suppression is a desirable phenomenon in numerous applications other than aircraft engines, and the present invention discloses means for accomplishing such suppression in these applications. Also, the embodiments of the present invention disclosed herein may be varied substantially; as for instance, a variation of the disposition of axially extending partitions 40 could provide another set of canted partitions. In the same vein, other variations of partition canting can be performed without varying the function or conceptual basis thereof. Such variations are likely to be made by those skilled in the art and are intended to be comprehended by the appended claims.

What is claimed as new and desired to be secured by Letters Patent of the United States is:

1. A sound-wave suppressing panel for use in a duct, the panel substantially circumscribing the duct and including:
   a first sound-wave permeable wall partially defining the duct;
   a second wall, impermeable to sound-waves, spaced radially from the first wall and therewith defining a substantially annular gap;
   a first plurality of circumferentially extending and axially spaced sound-wave impermeable partitions extending substantially between said first and second walls for dividing the gap into a plurality of resonator cavities;
   wherein said first and second walls are spaced apart by a distance d defined by the relationship $$f_H = C/2\pi \ \sqrt{OA/l_{eff}d}, \ l_{eff} \approx t + k(2r);$$

and said preselected pairs of partitions are canted with respect to said second wall to define a cavity length $x$ defined by the relationship $$f_{\lambda/4} = n\,C/4x, \ n = 1, 3, 5, \ldots;$$

where $f_H < f_{\lambda/4}$.

* * * * *